Patented Aug. 5, 1952

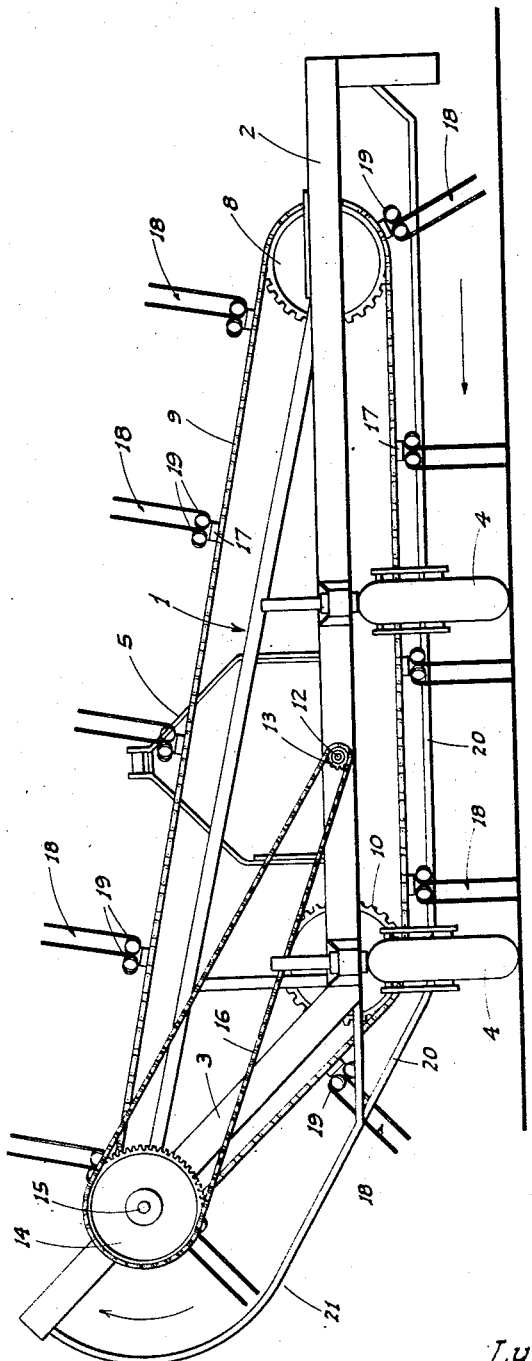

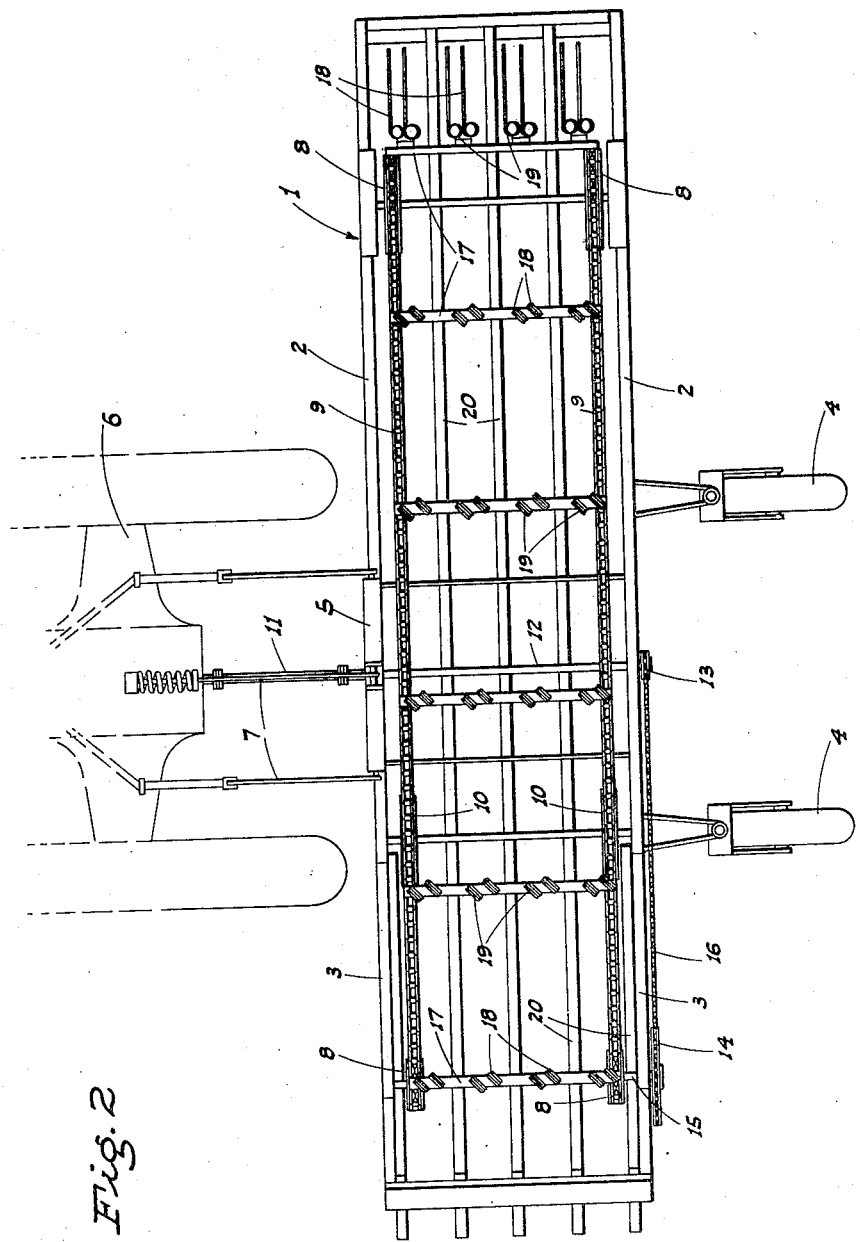

2,605,599

UNITED STATES PATENT OFFICE 2,605,599

SIDE DELIVERY RAKE

Lynn G. Curry, Tulare, Calif., assignor to Curry Manufacturing Co., Inc., Tulare, Calif., a corporation of Nevada Application January 31, 1949, Serial No. 73,721

1 Claim. (Cl. 56—27)

This invention relates to side delivery hay rakes, my principal object being to provide a rake of this character which includes what I believe to be a novel structure for raking the hay, and delivering it to one side of the path of movement of the rake in the form of a windrow, as the rake advances along the field.

Another object is to provide a rake of this general type which functions without the need of any manual control mechanism and which has no intricate mechanisms to give trouble or get out of order.

A further object of the invention is to produce a practical device and one which will be exceedingly effective for the purpose for which it is designed.

These objects are accomplished by means of such structure and relative arrangement of parts as will fully appear by a perusal of the following specification and claim.

In the drawings:

Figure 1 is a rear end elevation of the rake.

Figure 2 is a top plan view of the same as connected to a tractor.

Referring now more particularly to the characters of reference on the drawings, the rake structure comprises a rectangular frame 1 elongated transversely of the direction of travel and including parallel side beams 2 which extend horizontally from one end of the frame for a relatively great distance and then project at an upward angle for the remainder of their length, as at 3.

The frame is supported at the rear by a pair of trailing caster wheels 4 disposed in suitably spaced relation, and at its forward end is provided with a rigid upstanding A-frame 5 disposed centrally of the transverse extent of the frame and by which draft connection with a tractor 6 is made through the medium of draft arms and linkage, indicated generally at 7, and which are conventional features of the well-known "Ford-Ferguson" system.

Mounted in the frame, adjacent its ends and just inwardly of the side beams 2, are pairs of sprocket wheels 8 over which endless chains 9 pass. Another pair of sprocket wheels 10 is mounted at the junction of the sloping and horizontal portions of the beams 2 and are arranged so that the lower run of the chains along the horizontal portion of the beams 2 is also horizontal or parallel to the ground.

The chains are driven from the tractor in a direction such that the lower run thereof travels toward the upwardly sloping beam portions 3 by means of a universal joint shaft unit 11 extending rearwardly from the power take-off of the tractor and connected to a cross shaft 12 fixed on the frame 1 and having a sprocket 13 on its rear end. Another sprocket 14 is mounted on the shaft 15 of the upper pair of sprocket wheels 8 and is connected to the sprocket 13 by endless drive chains 16. The speed of shaft unit 11 is synchronized with that of the ground speed of the tractor so that the endless chains 9 move at approximately the same transverse speed as the forward speed of the rake itself.

Cross bars 17 connect the chains at intervals; rake tooth units 18 of the conventional double-tine spring form projecting outwardly from the bars; the length of the tine being such that they just clear the ground along the horizontal portion of the lower run of the chains, as shown in Fig. 1. The tines and coil springs 19 of each unit 18 are set at 45 degrees to the line of travel so that the forward motion of the rake and the transverse movement of the teeth compensate each other and the hay is raked straight across the line of travel.

Stripping bars 20 are secured to the frame and extend the full length thereof between the rows of tooth units 18, said bars along the horizontal portion of the frame being disposed just below the cross bars 17, and then sloping upwardly at a lesser angle than that of the frame portion 3 and the adjacent portion of the lower run of the chains so as to clear the teeth entirely, as at 21, before the chains turn about the upper sprockets 8.

It will, therefore, be seen that with the forward travel of the implement and the accompanying synchronized transverse movement of the chains and rake teeth, the hay on the ground in the path of the implement will be raked laterally, and as the teeth raise with the accompanying upward slope of the chains the hay will be left on the ground as a windrow; any hay clinging to and being lifted by the teeth being stripped and dropped onto the windrow as the teeth pass between and assume a position back of the adjacent portion of the stripping bars.

It will be appreciated that while the rake is here shown and described as being pulled along behind the tractor, the rake can be readily mounted in front of the tractor to be pushed forwardly.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described the invention, the following is claimed as new and useful and upon which Letters Patent is desired:

A side delivery hay rake comprising a frame adapted to be supported from and drawn along the ground, said frame being elongated transversely of the direction of travel, pairs of spaced sprocket wheels mounted on the frame and disposed in spaced relation along the same, endless chains about said wheels, the latter being arranged so that a portion of the length of the lower run thereof is parallel to the ground, cross bars connecting the chains at intervals, rake tooth units spaced along and projecting outwardly from each bar, and means to drive the chains at substantially the same speed as the movement of the rake along the ground; each tooth unit including a pair of spaced tines disposed in a plane extending lengthwise of the line of travel which plane is at 45 degrees to said line of travel; the trailing one of the tines relative to the forward movement of the rake being the leading tine relative to the lateral movement of the lower run of the chains.

LYNN G. CURRY.

REFERENCES CITED

The following references are of record in the file of this patent:

UNITED STATES PATENTS

| Number | Name | Date |
|---|---|---|
| 2,498,650 | Crain | Feb. 28, 1950 |
| 2,525,090 | Bott | Oct. 10, 1950 |

FOREIGN PATENTS

| Number | Country | Date |
|---|---|---|
| 6,504 | Great Britain | 1900 |
| 20,831 | Great Britain | 1907 |